United States Patent
Danielson et al.

(10) Patent No.: US 6,741,424 B1
(45) Date of Patent: May 25, 2004

(54) HEAD SUSPENSION WITH RAIL AND STIFFENER COMBINATION

(75) Inventors: Reid C. Danielson, Cokato, MN (US); Jacob D. Bjorstrom, Waconia, MN (US)

(73) Assignee: Hutchinson Technology, Inc., Hutchinson, MN (US)

( * ) Notice: Subject to any disclaimer, the term of this patent is extended or adjusted under 35 U.S.C. 154(b) by 108 days.

(21) Appl. No.: 10/229,606

(22) Filed: Aug. 28, 2002

Related U.S. Application Data

(60) Provisional application No. 60/316,506, filed on Aug. 31, 2001.

(51) Int. Cl.$^7$ ................................................. G11B 5/48
(52) U.S. Cl. ...................................................... 360/244.9
(58) Field of Search ........................... 360/244.2, 244.3, 360/244.4, 244.8, 244.9

(56) References Cited

U.S. PATENT DOCUMENTS

| | | | | |
|---|---|---|---|---|
| 3,931,641 A | | 1/1976 | Watrous ................... | 360/245.5 |
| 4,992,898 A | | 2/1991 | Wanlass ................... | 360/244.9 |
| 4,996,616 A | | 2/1991 | Aoyagi et al. ........... | 360/244.9 |
| 5,006,946 A | | 4/1991 | Matsuzaki ............... | 360/245.9 |
| 5,027,240 A | | 6/1991 | Zarouri et al. ........... | 360/244.2 |
| 5,027,241 A | * | 6/1991 | Hatch et al. ............. | 360/255 |
| 5,107,383 A | | 4/1992 | Takeuchi et al. ........ | 360/245.4 |
| 5,124,864 A | | 6/1992 | Matsuzaki ............... | 360/244.4 |
| 5,187,625 A | | 2/1993 | Blaeser et al. ........... | 360/244.3 |
| 5,570,249 A | | 10/1996 | Aoyagi et al. ........... | 360/244.3 |
| 5,570,261 A | | 10/1996 | Frater et al. ............. | 360/244.3 |
| 5,594,607 A | * | 1/1997 | Erpelding et al. ....... | 360/244.3 |
| 5,793,569 A | | 8/1998 | Christianson et al. ..... | 360/244.3 |
| 5,850,319 A | | 12/1998 | Tangren .................... | 360/244.9 |
| 5,864,445 A | * | 1/1999 | Bennin et al. ............ | 360/245.9 |
| 5,875,071 A | | 2/1999 | Erpelding et al. ....... | 360/244.3 |
| 5,875,072 A | * | 2/1999 | Brooks et al. ........... | 360/244.3 |
| 5,894,381 A | * | 4/1999 | Allen et al. .............. | 360/244.9 |
| 5,894,655 A | * | 4/1999 | Symons .................... | 29/603.03 |
| 5,943,774 A | | 8/1999 | Danielson et al. ........ | 29/896.9 |
| 5,969,906 A | * | 10/1999 | Arya et al. ............... | 360/245 |
| 6,014,289 A | * | 1/2000 | Goss ......................... | 360/244.1 |
| 6,215,622 B1 | * | 4/2001 | Ruiz et al. ................ | 360/244.3 |
| 6,341,050 B1 | * | 1/2002 | Coon ........................ | 360/244.9 |
| 6,594,114 B1 | * | 7/2003 | Suzuki et al. ............ | 360/244.3 |
| 2002/0176209 A1 | * | 11/2002 | Schulz et al. ............ | 360/244.3 |
| 2003/0231431 A1 | * | 12/2003 | Bhattacharya et al. ... | 360/244.2 |

FOREIGN PATENT DOCUMENTS

| | | |
|---|---|---|
| EP | 0986049 A1 | 3/2000 |
| JP | 63261584 | 10/1988 |
| JP | 04291066 A | 10/1992 |
| WO | WO 96/36044 | 11/1996 |

* cited by examiner

*Primary Examiner*—Jefferson Evans
(74) *Attorney, Agent, or Firm*—Faegre & Benson, LLP

(57) ABSTRACT

A head suspension assembly for a rigid disk drive. The load beam has a mounting region at a proximal end, a rigid region at a distal end and a spring region connecting the mounting region and the rigid region. A pair of rails extend along a portion of the rigid region. The rigid region has a railed region and a non-railed region adjacent to the spring region. A stiffener is attached to the load beam in a multi-layered structure. The stiffener has a proximal portion extending along at least a portion of the non-railed region without extending into the spring region, and a distal portion extending along 50% or less of a length of the railed region closest to the spring region.

19 Claims, 2 Drawing Sheets

HEAD SUSPENSION WITH RAIL AND STIFFENER COMBINATION

REFERENCE TO RELATED APPLICATION

This application claims the benefit of U.S. Provisional Application Serial No. 60/316,506 filed Aug. 31, 2001, which is hereby incorporated by reference in its entirety.

FIELD OF THE INVENTION

The present invention is directed to a head suspension with a rigid region having a railed region and a non-railed region. A stiffener that extends along at least part of the non-railed region and 50% or less of the length of the railed region closest to the spring region is attached to the rigid region.

BACKGROUND OF THE INVENTION

Information storage devices typically include a head for reading and/or writing data onto the storage medium, such as a disk within a rigid disk drive. An actuator mechanism is used for positioning the head at specific locations or tracks in accordance with the disk drive usage. Linear and rotary actuators are known based on the manner of movement of the head. Head suspensions are provided between the actuator and the head and support the head in proper orientation relative to the disk surface.

In a rigid disk drive, head suspensions are provided which support a read/write head to "fly" over the surface of the rigid disk when it is spinning. Specifically, the head is typically located on a slider having an aerodynamic design so that the slider flies on an air bearing generated by the spinning disk. In order to establish the fly height, the head suspension is also provided with a spring force counteracting the aerodynamic lift force.

A head suspension of the type used in a rigid disk drive comprises a load beam and a flexure to which the slider is to be mounted. Load beams normally have an actuator mounting portion, a rigid section, and a spring region between the actuator mounting region and the rigid section that provides the aforementioned spring force. The flexure is provided at the distal end of the load beam to which the slider is mounted and permits pitch and roll movements of the slider to follow disk surface fluctuations. Flexures are known that are integrated into the design of the load beam and those formed as a separate element fixed to the rigid region of the load beam.

In providing the spring force to the rigid section of the load beam for counteracting the aerodynamic lift force against a slider, a preformed bend or radius is made in the spring region of the load beam. The radius provides the spring force and thus a desired gram loading to the slider for a predetermined offset height, the offset height being a measurement of the distance between the mounting height of the head suspension and the slider at "fly" height. Constraints of the drive design, including the spacing of the disks within the drive, factor into the predetermined offset height. In any case, the gram load at the offset height provides the counteracting force to the aerodynamic lift force to establish the "fly" height of the slider above a disk surface. As used hereinafter, the term "loaded" refers to a head suspension and slider at "fly" height and in equilibrium under the influence of the aerodynamic lift force and the oppositely acting spring force of the head suspension.

The radius area of the spring region is not only responsible for loading, but has also been determined to have a large impact on torsional resonance characteristics of the head suspension. Resonance frequencies of the head suspension, if not controlled, can lead to off-track error within such a disk drive. Head suspensions are designed to optimize performance even at resonance frequencies, which include a lateral bending mode and torsional modes. More particularly, it is a design criterion to increase certain resonance frequencies to be higher than the vibrations experienced in the disk drive application. Additionally, it is desirable to reduce or eliminate the movement or gain of the head at the resonance frequencies of the head suspension.

Torsional and lateral bending modes are beam modes that are dependent on cross-sectional properties along the length of the load beam. These modes also result in lateral movement of the slider at the end of the head suspension assembly. Torsional modes sometimes produce a mode shape in which the tip of the resonating head suspension assembly moves in a circular fashion. However, since the slider is maintained at an offset height by the stiffness of the applied spring force, only lateral motion of the rotation is seen at the slider. The lateral bending mode (often referred to as "sway") is primarily lateral motion.

The lateral bending mode is normally controlled by the design of the cross-section of the load beam, i.e., side rails, channels, and the like. It is typically desirable to control the resonance frequency of the lateral bending mode so that it is higher than the frequencies that are experienced in the disk drives within which they are to be used.

For example, U.S. Pat. No. 5,006,946 (Matsuzaki) discloses a head suspension with side rails and a longitudinal plate of polymeric resinous material. The polymeric material extends from the mounting region, across the spring region and along at least a portion of the rigid region. U.S. Pat. No. 5,850,319 (Tangren) discloses a head suspension with a shorter spring region and a stiffener formed in the top profile of the load beam. The stiffener covers the proximal portion of the rigid region for increasing lateral and torsional stiffness. The stiffener decreases in width extending toward the distal end of the load beam.

Torsional modes, however, typically occur at lower frequencies, but typically have less of a lateral effect. Torsional modes are further subdivided depending on the number, if any, of nodes present along the length of the suspension assembly between a fixed end thereof and its free end. The slider would be supported near the free end. These various torsional mode shapes occur at different resonance frequencies. A single twist of the head suspension between a fixed end and its free end is referred to as first torsion mode. The off-track motion at the first torsion resonance frequency is the first torsional gain. Second torsional mode means a torsional mode shape having a single node along the length suspension between its fixed end and its free end. The position of the node divides the head suspension into first and second twisting motions on either side of the node point. Second torsional resonance frequencies occur at higher frequencies than the first torsional mode. Higher order torsional modes, i.e., third torsional mode having two node points, etc. typically occur at frequencies higher than those experienced within a typical disk drive environment.

The mass of the head suspension and how that mass is distributed along the head suspension has a large impact on the head suspension resonance frequencies, gain characteristics, and shock performance. For example, the addition of mass at a location of maximum displacement for a particular mode (bending or torsional) will generally reduce the natural frequency. Moreover, the lowering of the natural frequency may also increase the gain and shock performance. Mass located closer to the spring region is less detrimental to shock performance than mass loser to the distal end. To complicate matters, mass added at a specific location may advantageously increase lateral stiffness and thus the lateral bending mode resonance frequency, for example, but at the same time have a negative effect on a torsional resonance frequency.

To provide a high lateral bending frequency, the head suspension needs to be stiff in both the lateral direction and torsionally along the entire length of the head suspension. If a head suspension is designed with only one of these conditions in mind, the head suspension may have a low resonance frequency of torsional or lateral bending with a high degree of off-track motion or gain. A head suspension having a high lateral stiffness but a low torsional stiffness will not move strictly laterally due to the high lateral stiffness, but may twist at a lower resonance frequency. If the head suspension has high torsional stiffness and low lateral stiffness, the head suspension may deflect primarily laterally at a lower resonance frequency.

As an example, a wide head suspension load beam is described in U.S. Pat. No. 4,992,898 to Wanlass. The relatively wide and evenly spaced side edges of the Wanlass design provide a load beam having a relatively high lateral stiffness. However, this increase is at the expense of torsional stiffness, which without further compensating features would tend to reduce the resonance frequency of the torsional and sway modes.

An example of a head suspension load beam shape designed primarily to increase torsional resonance frequencies is shown in U.S. Pat. No. 5,027,240 to Zarouri, et al. In this case, mass is reduced significantly along the length of the head suspension to increase its torsional stiffness. However, this decrease in mass along the head suspension length has a negative effect in lateral stiffness. Again, while one stiffness is increased, the other is reduced.

BRIEF SUMMARY OF THE INVENTION

The present invention is directed to a head suspension assembly for a rigid disk drive. The load beam has a mounting region at a proximal end, a rigid region at a distal end and a spring region connecting the mounting region and the rigid region. A pair of rails extend along a portion of the rigid region. The rigid region has a railed region and a non-railed region adjacent to the spring region. A stiffener is attached to the load beam in a multi-layered structure. The stiffener has a proximal portion extending along at least a portion of the non-railed region without extending into the spring region, and a distal portion extending along 50% or less of a length of the railed region closest to the spring region.

In one embodiment, the railed region and/or the non-railed region have a delta shape. The load beam preferably comprises a metal having a thickness of 0.0025 inches or less.

In one embodiment, the proximal portion of the stiffener has a delta shape. In another embodiment, the stiffener has a shape generally corresponding to a shape of the non-railed region. The stiffener can be any regular or irregular shape, such as rectangular or curvilinear. In another embodiment, the distal portion of the stiffener has a shape generally corresponding to a shape of the railed region of the rigid region closest to the spring region.

In one embodiment, the distal portion of the stiffener is attached to less than 40% of the length of the railed region closest to the spring region. In another embodiment, the distal portion of the stiffener is attached to about 20% of the length of the railed region closest to the spring region. The stiffener preferably comprises a thin metal having a thickness of about 0.002 inches to about 0.004 inches. The stiffener is typically attached to the load beam by welds, although adhesives can be used. In one embodiment, the welds are located at each corner of the stiffener.

DETAILED DESCRIPTION OF THE INVENTION

Figure 1:
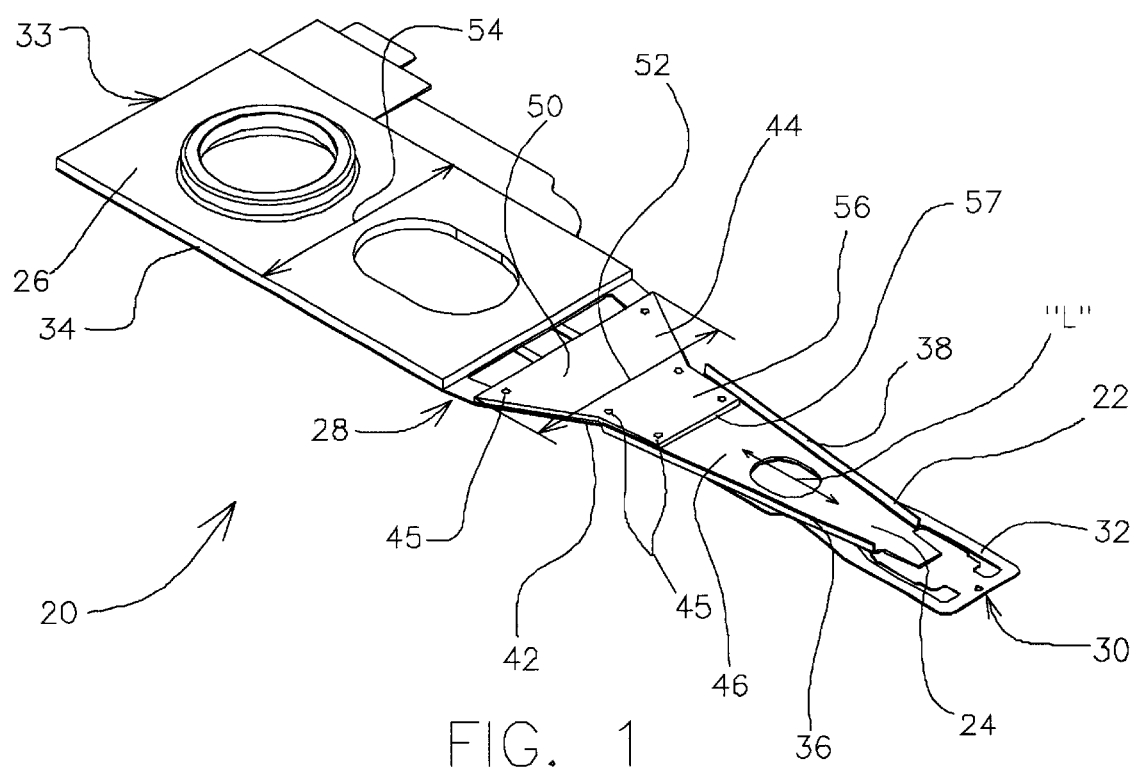
FIG. 1 is a perspective view of a head suspension assembly in accordance with the present invention.
Figure 2:
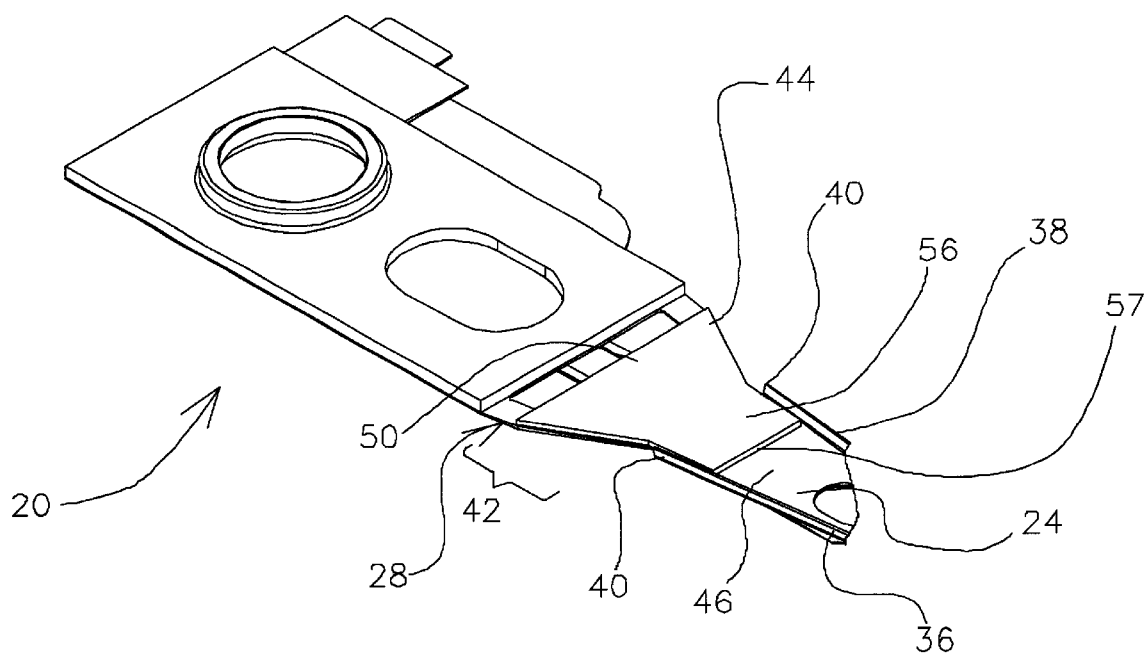
FIG. 2 is an enlarged perspective view of the head suspension of FIG. 1.

FIGS. 1 and 2 are perspective views of a head suspension assembly 20 in accordance with present invention. The head suspension assembly 20 includes a load beam 22 with a rigid region 24 connected to a mounting region 26 by spring region 28. Distal end 30 of the rigid region 24 includes a flexure 32. Proximal end 33 of the load beam 22 includes a base plate 34 used to mount the head suspension assembly 20 to an actuator arm.

The rigid region 24 includes a pair of rails 36, 38. The rigid region 24 has a railed region 46 and a non-railed region 42 adjacent to the spring region 28. Proximal ends 40 of the rails 36, 38 do not extend to the spring region 28. Rather, non-railed region 42 of the rigid region 24 is generally planar. In the preferred embodiment, the non-railed region 42 is typically a delta shape with increasing width closer to the spring region 28. Alternatively, the non-railed region 42 can have a variety of other regular or irregular shapes, such as rectangular and curvilinear. As used herein, "non-railed region of the rigid region" refers to a generally planar portion of a rigid region closest to the spring region.

Stiffener 44 is attached to the load beam 22 to form a multi-layered structure. Proximal portion 50 of stiffener 44 extends along the non-railed region 42 of the rigid region 24, typically along the edge of the spring region 28. The stiffener 44 abuts the spring region 28, but does not cross to the base plate 34. Consequently, a gap is formed between the stiffener 44 and the base plate 34.

Distal portion 56 of the stiffener 44 overlaps a portion of the railed region 46 of the rigid region 24. The stiffener 44 preferably overlaps about 50% or less, and more typically about 20% to about 40%, of a length "L" of the railed region 46 closest to a spring region 28. The relatively small amount of overlap locates the bulk of the mass of the stiffener 44 closer to the mounting region 26. As used herein, "multi-layered structure" refers to two or more discrete parts attached to form a single assembly.

The stiffener 44 can be attached to the non-railed region 42 and railed region 46 using adhesives, welding, fasteners, interconnecting features, or a combination thereof. Suitable adhesives include pressure sensitive adhesives, thermosetting or thermoplastic adhesives, radiation cured adhesives, adhesives activated by solvents, and combinations thereof. In one embodiment, the stiffener 44 is welded to the load beam 22. For example, a weld point 45 can be located at each of the four corners of the stiffener 44 and on each side of the transition line dividing the proximal portion 42 from the distal portion 56.

In the illustrated embodiment, proximal portion 50 of the stiffener 44 has a delta shape, with a width 52 that generally corresponds to a width 54 of the mounting region 26. The stiffener 44 has a taper that narrows from the proximal portion 50 towards the rigid region 24. The taper generally corresponds with the shape of the non-railed region 42 of the rigid region 24. Distal end 56 of the stiffener 44 is narrower than the proximal portion 50. In the illustrated embodiment, the distal portion 56 has a shape generally corresponding to the gap between the rails 36, 38. The stiffener can be a variety of other regular or irregular shapes, such as rectangular or curvilinear.

The present head suspension assembly 20 has three distinct zones. The first zone is located along the base plate 34 and mounting region 26 to the proximal ends 40 of the rails 36, 38. The second zone is a transitional zone where the distal end 56 of the stiffener 44 overlaps the railed region 46. The third zone is a thin beam zone that extends from the distal edge 57 of the stiffener 40 to the distal end 30 of the flexure 32.

In one embodiment, the head suspension assemble 20 is formed from a thin metal having a thickness of about 0.0025 inches or less. The stiffener 44 is typically stainless steel with a thickness of about 0.002 inches to about 0.004 inches. The present design is generally at least 8 milligrams less massive, with more of the mass located closer to the spring region, than a conventional multi-piece head suspension of similar length and base plate configuration. The mass reduction also increases the shock performance by 30–50 G's/gram over the more massive multi-piece designs. Locating the stiffener 44 near the radius region keeps resonance frequencies equal to or better than that of the multi-piece designs.

By concentrating the mass of the stiffener 44 near the spring region 28, without extending into the spring region, resonant frequencies for bending, torsion and sway remain equal to or better than typical thick beam multi-piece head suspension assemblies having a comparable spring rate. Because the overall mass of the head suspension assembly 20 is typically less than a multi-piece suspension, shock capabilities of the present head suspension assembly 20 are also higher.

Table 1 summarizes the first bending frequency, first torsion frequency, sway frequency and shock capabilities for a head suspension in accordance with the present invention, designated the 3730 Hybrid, and two commercially available multi-piece head suspensions. All three head suspensions were 14.5 millimeter constructions. The 3730 Hybrid is configured substantially as shown in FIGS. 1 and 2. The models 3530HL and 3530 are available from Hutchinson Technology Incorporated located in Hutchinson, Minn.

TABLE 1

| | 1st Bending Frequency (kHz) | 1st Torsional Frequency (kHz) | Sway Frequency (kHz) | Shock (G/gram) |
|---|---|---|---|---|
| 3730 Hybrid | 2.8 | 7.9 | 16.1 | 154 |
| 3530 HL | 3 | 7.5 | 12.6 | 100 |
| 3530 | 3 | 9.3 | 15.9 | 97 |

As is clear from Table 1, the first bending frequency, first torsional frequency and sway frequency for the 3730 Hybrid in accordance with the present invention are comparable to the prior art multi-piece structures. The present 3730 Hybrid, however, demonstrates more than a 50% improvement in shock capabilities over the prior art multi-piece structures.

All patents and patent applications disclosed herein, including those disclosed in the background of the invention, are hereby incorporated by reference. Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A head suspension assembly for a rigid disk drive comprising:
   a load beam having a mounting region at a proximal end, a rigid region at a distal end, and a spring region connecting the mounting region and the rigid region;
   a pair of rails extending along a portion of the rigid region, the rigid region having a railed region and a non-railed region adjacent to the spring region; and
   a stiffener attached to the load beam in a multi-layered structure, the stiffener having a proximal portion extending along at least a portion of the non-railed region without extending into the spring region, and a distal portion extending along up to about 50% of a length of the railed region.

2. The head suspension of claim 1 wherein the non-railed region comprises a delta shape.

3. The head suspension of claim 1 wherein the railed region comprises a delta shape.

4. The head suspension of claim 1 wherein the load beam comprises a thin metal having a thickness of up to about 0.0025 inches.

5. The head suspension of claim 1 wherein the proximal portion of the stiffener has a delta shape.

6. The head suspension of claim 1 wherein the stiffener has a shape generally corresponding to a shape of the non-railed region and the railed region closest to the spring region.

7. The head suspension of claim 1 wherein the distal portion of the stiffener extends along about 20% to about 40% of the length of the railed region closest to the spring region.

8. The head suspension of claim 1 wherein the distal portion extends along less than about 40% of a length of the railed region.

9. The head suspension of claim 1 wherein the distal portion of the stiffener has a shape generally corresponding to a shape of the railed region of the rigid region closest to the spring region.

10. The head suspension of claim 1 wherein the proximal portion of the stiffener has a shape generally corresponding to a shape of the non-railed region of the rigid region.

11. The head suspension of claim 1 wherein the stiffener comprises a metal having a thickness of about 0.002 inches to about 0.004 inches.

12. The head suspension of claim 1 wherein the stiffener is attached to the load beam by welds.

13. The head suspension of claim 1 wherein the stiffener is attached to the load beam by welds located at each corner of the stiffener.

14. The head suspension of claim 1 wherein the stiffener is attached to the load beam by an adhesive.

15. A head suspension assembly for a rigid disk drive comprising:
   a load beam having a mounting region at a proximal end, a rigid region at a distal end, and a spring region connecting the mounting region and the rigid region;

a pair of rails extending along a portion of the rigid region, the rigid region having a railed region and a non-railed region adjacent to the spring region; and a stiffener attached to the load beam in a multi-layered structure, the stiffener having a proximal portion extending along at least a portion of the non-railed region without extending into the spring region, and a distal portion extending along at least a portion of a length of the railed region.

16. The head suspension of claim 15 wherein the stiffener has a shape generally corresponding to a shape of the non-railed region and the railed region closest to the spring region.

17. The head suspension of claim 15 wherein the distal portion of the stiffener has a shape generally corresponding to a shape of the railed region of the rigid region closest to the spring region.

18. The head suspension of claim 15 wherein the proximal portion of the stiffener has a shape generally corresponding to a shape of the non-railed region of the rigid region.

19. The head suspension of claim 15 wherein the stiffener comprises a metal having a thickness of about 0.002 inches to about 0.004 inches.

* * * * *